(12) United States Patent
Strandberg

(10) Patent No.: US 9,593,721 B2
(45) Date of Patent: Mar. 14, 2017

(54) ELECTRONIC REAR DRIVE MODULE WITH SPLIT HALFSHAFT FLANGE

(71) Applicant: e-AAM Driveline Systems AB, Trollhättan (SE)

(72) Inventor: Mats Strandberg, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 189 days.

(21) Appl. No.: 14/547,565

(22) Filed: Nov. 19, 2014

(65) Prior Publication Data

US 2016/0138659 A1    May 19, 2016

(51) Int. Cl.

| | |
|---|---|
| *F16D 3/22* | (2006.01) |
| *F16H 48/08* | (2006.01) |
| *B60K 1/00* | (2006.01) |
| *B60K 17/16* | (2006.01) |
| *F16D 3/223* | (2011.01) |
| *F16D 3/227* | (2006.01) |
| *F16H 48/36* | (2012.01) |
| *F16D 1/076* | (2006.01) |
| *F16D 1/116* | (2006.01) |
| *F16D 1/10* | (2006.01) |

(52) U.S. Cl.
CPC ............ *F16D 3/223* (2013.01); *B60K 1/00* (2013.01); *B60K 17/16* (2013.01); *F16D 3/227* (2013.01); *B60K 2001/001* (2013.01); *F16D 1/076* (2013.01); *F16D 1/116* (2013.01); *F16D 2001/103* (2013.01); *F16D 2003/22326* (2013.01); *F16H 48/08* (2013.01); *F16H 2048/082* (2013.01); *F16H 2048/364* (2013.01)

(58) Field of Classification Search
CPC .......... F16D 2/223; F16D 2/227; F16D 1/076; F16D 1/116; F16D 2003/22326; F16D 2001/103; F16H 48/08; F16H 2048/364; F16H 2048/082; B60K 1/00; B60K 17/16; B60K 2001/001
USPC ........ 475/149, 150, 151, 204, 205, 221, 225
See application file for complete search history.

(56) References Cited

U.S. PATENT DOCUMENTS

| | | |
|---|---|---|
| 3,362,193 A | 1/1968 | Ritsema |
| 3,452,558 A | 7/1969 | Cull et al. |
| 5,334,096 A * | 8/1994 | Iwao ...................... F16D 3/227 |
| | | 310/326 |
| 8,663,051 B2 | 3/2014 | Sten |
| 8,998,765 B2 * | 4/2015 | Sten ...................... F16H 48/36 |
| | | 475/150 |

(Continued)

*Primary Examiner* — Jacob S Scott
(74) *Attorney, Agent, or Firm* — Harness, Dickey & Pierce, P.L.C.

(57) ABSTRACT

The present teachings provide for a vehicle drive module including a housing, an electric motor, a transmission gear set, a differential assembly, and a pair of output members. The transmission gear set can transmit rotary power between a motor output shaft and an output of the transmission gear set. The differential assembly can include a case, a pair of pinion gears, and a pair of side gears. Each of the side gears can be meshingly engaged with the pair of pinion gears. Each output member can include a driven body and an outer flange. The driven body can have a first end drivingly coupled to one of the side gears. The outer flange can have a first side that is releasably coupled to the second end of the driven body, and a second side that is adapted to be releasably coupled to a constant velocity joint.

19 Claims, 4 Drawing Sheets

(56) References Cited

U.S. PATENT DOCUMENTS

| | | | |
|---|---|---|---|
| 2003/0203543 A1 | 10/2003 | Tanabe et al. | |
| 2005/0170899 A1* | 8/2005 | Dine | F16D 3/2237 |
| | | | 464/145 |
| 2012/0202607 A1* | 8/2012 | Fujio | F16D 3/2245 |
| | | | 464/144 |
| 2014/0213374 A1* | 7/2014 | Cassell | F16D 3/223 |
| | | | 464/145 |

* cited by examiner

ELECTRONIC REAR DRIVE MODULE WITH SPLIT HALFSHAFT FLANGE

FIELD

The present disclosure relates to an electronic rear drive module with a split halfshaft flange.

BACKGROUND

This section provides background information related to the present disclosure which is not necessarily prior art.

Exemplary electronic drive modules ("eDMs", e.g. electronic rear drive modules "eRDMs") are disclosed in U.S. Patent Application Publication No. 2012/0058855. The eDMs can be employed as a means for propelling a vehicle and/or as a means for enhancing the control of the vehicle through torque vectoring. The eDMs typically include an electric motor that transmits power to a transmission and a differential assembly to drive a pair of vehicle wheels.

In some circumstances, it is desirable to remove the eDM from the vehicle. In traditional systems, various suspension components must be removed before the eDM can be removed from the vehicle. Removal and reinstallation of such suspension components can be time consuming. Accordingly, there exists a need in the art for improved eDMs.

SUMMARY

This section provides a general summary of the disclosure, and is not a comprehensive disclosure of its full scope or all of its features.

The present teachings provide for a vehicle drive module including a housing, an electric motor, a transmission gear set, a differential assembly, and a pair of output members. The electric motor can be coupled to the housing and can have a motor output shaft. The transmission gear set can be received in the housing and can be coupled to the motor output shaft for transmission of rotary power between the motor output shaft and an output of the transmission gear set. The differential assembly can include a case, a pair of pinion gears, and a pair of side gears. The case can be supported within the housing for rotation about a first axis and can be drivingly coupled to the output of the transmission gear set. The pair of pinion gears can be received in the case and rotatable relative to the case about a second axis that is perpendicular to the first axis. The pair of side gears can be received in the case and can be rotatable about the first axis. Each of the side gears can be meshingly engaged with the pair of pinion gears. Each output member can include a driven body and an outer flange. The driven body can have a first end and a second end. The first end of the driven body can be drivingly coupled to a respective one of the side gears to receive rotary power therefrom. The outer flange can have a first side and a second side. The first side of the outer flange can be releasably coupled to the second end of the driven body. The second side of the outer flange can be adapted to be releasably coupled to a constant velocity joint.

The present teachings provide for a vehicle drive module including a housing, an electric motor, a transmission gear set, a differential assembly, and a pair of output members. The electric motor can be coupled to the housing and can have a motor output shaft. The transmission gear set can be received in the housing and can be coupled to the motor output shaft for transmission of rotary power between the motor output shaft and an output of the transmission gear set. The differential assembly can include a case, a pair of pinion gears, and a pair of side gears. The case can be supported within the housing for rotation about a first axis and can be drivingly coupled to the output of the transmission gear set. The pair of pinion gears can be received in the case and rotatable relative to the case about a second axis that is perpendicular to the first axis. The pair of side gears can be received in the case and can be rotatable about the first axis. Each of the side gears can be meshingly engaged with the pair of pinion gears. Each output member can include a driven body and an outer flange. The driven body can have a first end and a second end. The first end of the driven body can be drivingly coupled to a respective one of the side gears to receive rotary power therefrom. The second end of the driven body can define a circumferential lip. The outer flange can have an inner surface that defines a first inner cavity. The first inner cavity can be adapted to receive a portion of a constant velocity joint. The inner surface can be releasably mounted about the circumferential lip.

The present teachings provide for a vehicle drive module including a housing, an electric motor, a transmission gear set, a differential assembly, and a pair of output members. The electric motor can be coupled to the housing and can have a motor output shaft. The transmission gear set can be received in the housing and can be coupled to the motor output shaft for transmission of rotary power between the motor output shaft and an output of the transmission gear set. The differential assembly can include a case, a pair of pinion gears, and a pair of side gears. The case can be supported within the housing for rotation about a first axis and can be drivingly coupled to the output of the transmission gear set. The pair of pinion gears can be received in the case and rotatable relative to the case about a second axis that is perpendicular to the first axis. The pair of side gears can be received in the case and can be rotatable about the first axis. Each of the side gears can be meshingly engaged with the pair of pinion gears. Each output member can include a driven body and an outer flange. The driven body can have a first end and a second end. The first end of the driven body can be drivingly coupled to a respective one of the side gears to receive rotary power therefrom. The second end can include a first cylindrical portion and a second cylindrical portion. The first and second cylindrical portions can be coaxial with the first axis. The first cylindrical portion can have a diameter greater than the second cylindrical portion. The second cylindrical portion can extend axially in an outboard direction from the first cylindrical portion. The outer flange can have an inner surface that defines a first inner cavity. The first inner cavity can be adapted to receive a portion of a constant velocity joint. The inner surface can be releasably mounted about the second cylindrical portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
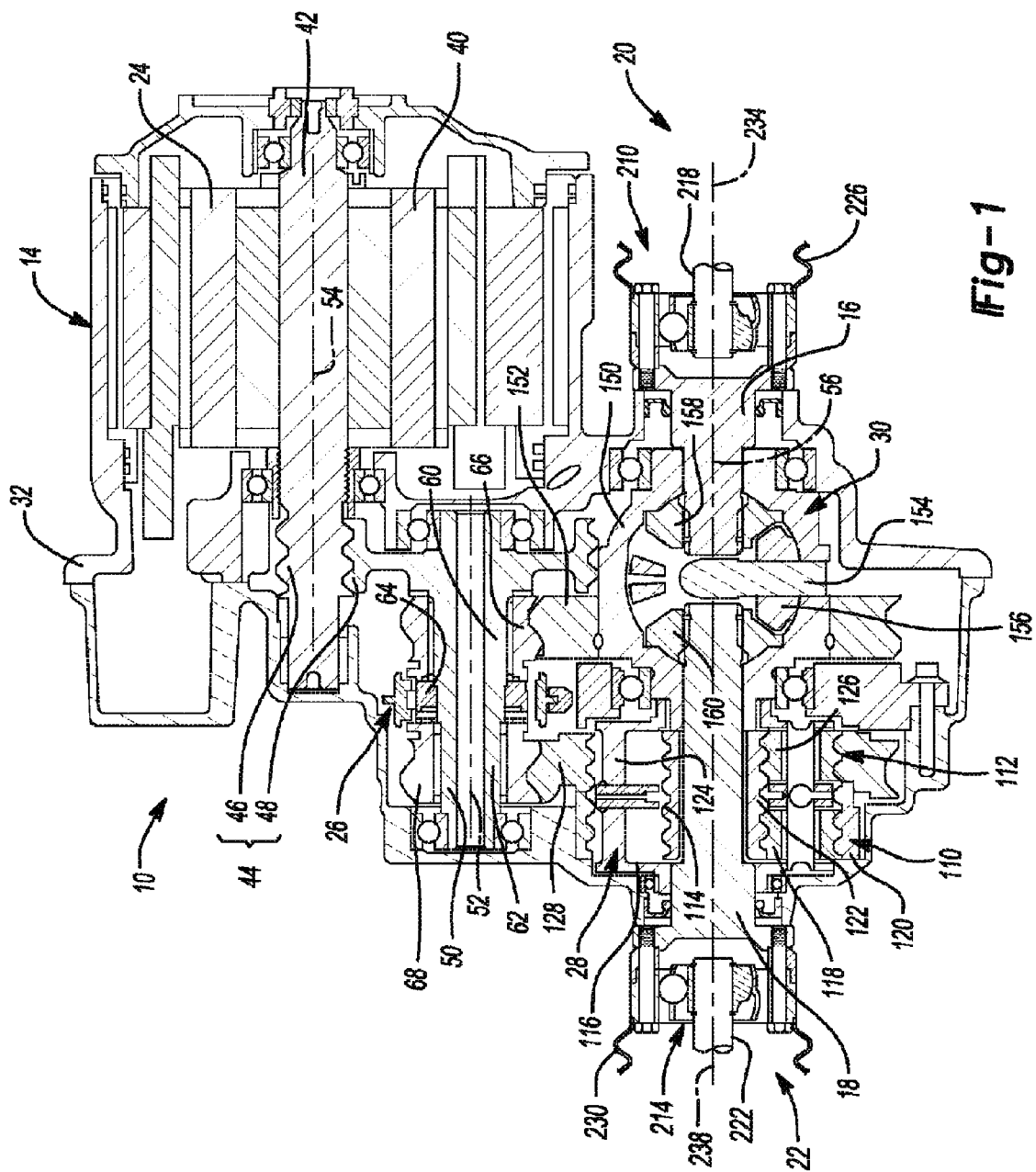
FIG. 1 is a sectional view of an exemplary drive module having a pair of output members and halfshafts constructed in accordance with the present disclosure.

In FIG. 1 of the drawings, a portion of an exemplary electronic drive module ("eDM") 10 constructed in accordance with the teachings of the present disclosure is illustrated. Except as noted herein, the eDM 10 can be generally similar to any of the drive modules which are disclosed in commonly assigned, co-pending U.S. patent application Ser. No. 13/835,043 filed Mar. 15, 2013 the disclosure of which is incorporated by reference as if fully set forth in detail herein.

Briefly, the eDM 10 can include a torque distribution drive mechanism 14 that can be employed to transmit torque to first and second output members 16, 18. Each output member 16, 18 can be coupled to a halfshaft 20, 22 as described below. The torque distribution drive mechanism 14 can comprise a drive mechanism 24, a power transmitting component or clutch mechanism 26, a dual planetary gear set 28, a differential assembly 30 and a housing 32 into which the drive mechanism 24, the clutch mechanism 26, the dual planetary gear set 28 and the differential assembly 30 can be housed.

The drive mechanism 24 can comprise any type of motor, such as an electric motor 40, and can have a motor shaft 42 that can be selectively driven to provide rotary power to a reduction drive 44. The reduction drive 44 can include a first pinion gear 46, which can be mounted to the motor shaft 42 for rotation therewith, and a second pinion gear 48 that can be meshingly engaged to the first pinion gear 46 and mounted to an intermediate shaft 50 for common rotation. The intermediate shaft 50 can be disposed along an intermediate axis 52 that is generally parallel to a motor axis 54 about which the motor shaft 42 of the motor 40 rotates. The intermediate axis 52 can be parallel to an output axis 56 about which the differential assembly 30 and the first and second output members 16 and 18 can rotate.

The intermediate shaft 50 can have a first journal portion 60, a second journal portion 62 and a drive portion 64 that can be disposed between the first and second journal portions 60 and 62. The drive portion 64 can have a plurality of external splines or teeth (not specifically shown). A first intermediate output gear 66 can be rotatably received on the first journal portion 60 and a second intermediate output gear 68 can be rotatably received on the second journal portion 62. Bearings (not specifically shown) can be received between the first and second journal portions 60 and 62 and the first and second intermediate output gears 64 and 66, respectively. Thrust bearings (not specifically shown) can be disposed along the length of the intermediate shaft 50 at various locations to help promote relative rotation between the drive portion 64 and the first and second intermediate output gears 66 and 68.

The clutch mechanism 26 can be employed to selectively couple the first intermediate output gear 66 or the second intermediate output gear 68 to the intermediate shaft 50.

The dual planetary gear set 28 can include a first planetary gear set 110 and a second planetary gear set 112. The first planetary gear set 110 can include a first sun gear 114, a first planet carrier 116, a plurality of first planet gears 118 and a first ring gear 120, while the second planetary gear set 112 can include a second sun gear 122, a second planet carrier 124, a plurality of second planet gears 126 and a second ring gear 128. The first sun gear 114 can be a hollow structure through which the second output member 18 can be received. The first planet carrier 116 can be rotatable relative to the housing 32 and can be coupled to the second output member 18 for common rotation. The first planet carrier 116 can have a plurality of first pins (not specifically shown) that can journally support the first planet gears 118. The first planet gears 118 can be meshingly engaged to the first sun gear 114 and the first ring gear 120. The first ring gear 120 can be non-rotatably coupled to the housing 32. The second sun gear 122 can be coupled to the first sun gear 114 for common rotation and can be a hollow structure through which the second output member 18 can be received. The second planet carrier 124 can be rotatable relative to the housing 32 and can have a plurality of second pins (not specifically shown) that can journally support the second planet gears 126. The second planet gears 126 can be meshingly engaged to the second sun gear 122 and the second ring gear 128. The second ring gear 128 can have a set of external teeth that can be meshingly engaged to the second intermediate output gear 68.

The differential assembly 30 can include a differential case 150, a ring gear 152, a cross-pin 154, a plurality of differential pinions 156, and first and second side gears 158 and 160. The differential case 150 can be coupled to the second planet carrier 124 for common rotation. The ring gear 152 can be mounted to the differential case 150 for common rotation and can be meshingly engaged to the first intermediate output gear 66. The cross-pin 154 can be mounted to the differential case 150 perpendicular to the output axis 56. The differential pinions 156 can be journally supported by the cross-pin 154 and meshingly engaged to the first and second side gears 158 and 160. The first output member 16 can be coupled to the first side gear 158 for rotation therewith, and the second output member 18 can be coupled to the second side gear 160 for rotation therewith.

Operation of the clutch mechanism 26 in a first mode (i.e., a propulsion mode) can couple the first intermediate output gear 66 to the intermediate shaft 50 to thereby drive the ring gear 152 of the differential assembly 30. Rotation of the ring gear 152 drives the differential case 150 and the cross-pin 154 for rotation about the output axis 56, driving the differential pinions 156 to cause corresponding rotation of the first and second side gears 158 and 160. In this mode, the dual planetary gear set 28 does not affect operation of the differential assembly 30 and, as such, the differential assembly 30 provides rotary power to the first and second output members 16 and 18 in the manner of a standard open differential assembly.

Operation of the clutch mechanism 26 in a second mode (i.e., a torque vectoring mode) can couple the second intermediate output gear 68 to the intermediate shaft 50 to thereby drive the second ring gear 128 of the dual planetary gear set 28. In this embodiment, rotary power is output from the second planetary gear set 112 to the differential case 150 (via the second planet carrier 124) and rotary power is output from the first planetary gear set 110 to the second output member 18 (via the first planet carrier 116). As the second output member 18 is non-rotatably coupled to the second side gear 160, it will be appreciated that the first planet carrier 116 is also drivingly coupled to the second side gear 160. Those of skill in the art will appreciate from this disclosure that the dual planetary gear set 28 can be employed to impose equal but opposite moments on the first and second output members 16 and 18 and that the direction of the rotary power (torque) that is applied to a given one of the output members 16, 18 is dependent upon the direction in which the motor 40 is operated.

Each halfshaft 20, 22 can include a constant velocity joint 210, 214, an axle shaft 218, 222, and a boot 226, 230. The constant velocity joint 210, 214 can be any suitable constant velocity joint, such as a Rzeppa, Weiss, or tripod joint for example, configured to transmit rotary power from the output member 16, 18 to a respective one of the axle shafts 218, 222, such that the output member 16,18 and the respective axle shaft 218, 222 rotate at the same angular velocity. The constant velocity joints 210, 214 can allow the axle shafts 218, 222 to articulate or pivot at angles relative to the output axis 56, while transmitting rotary power between the output member 16, 18 and the respective axle shaft 218, 222. In this way, each axle shaft 218, 222, can rotate about a halfshaft axis 234, 238 that can be coaxial with the output axis 56 when the respective axle shaft 218, 222 is aligned with the respective output member 16, 18, or can be transverse to the output axis 56 when the respective axle shaft 218, 222 is not aligned with a respective one of the output members 16, 18. In the example provided, each constant velocity joint 210, 214 is a type known in the art as a Rzeppa style, though other types of constant velocity joints can be used. Accordingly, the constant velocity joints 210, 214 will only briefly be described below. The boot 226, 230 can be any type of boot configured to retain lubricant (not shown) within constant velocity joint 210, 214, and prevent water and/or debris from entering the constant velocity joint 210, 214. In the example provided, the boot 226, 230 is a convoluted rubber boot that surrounds a portion of the halfshaft 20,22.

Figure 2:
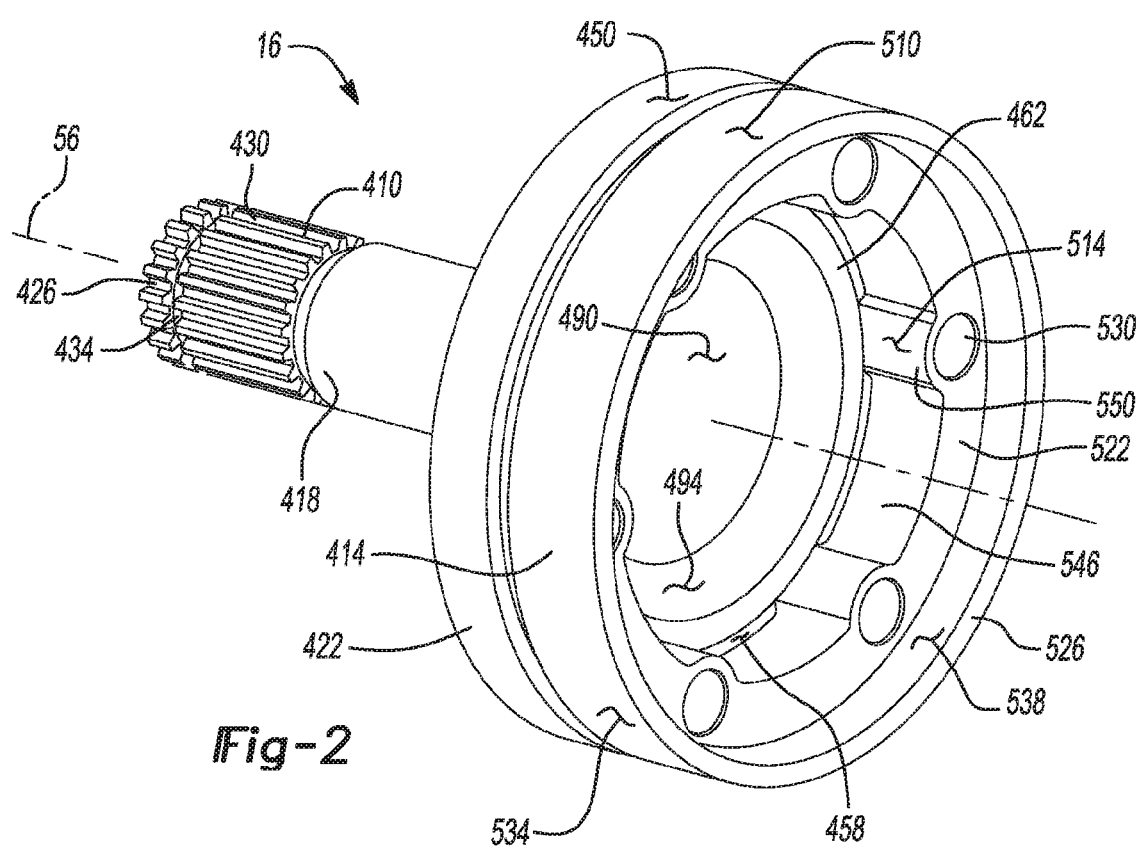
FIG. 2 is a perspective view of one of the output members of FIG. 1.
Figure 3:
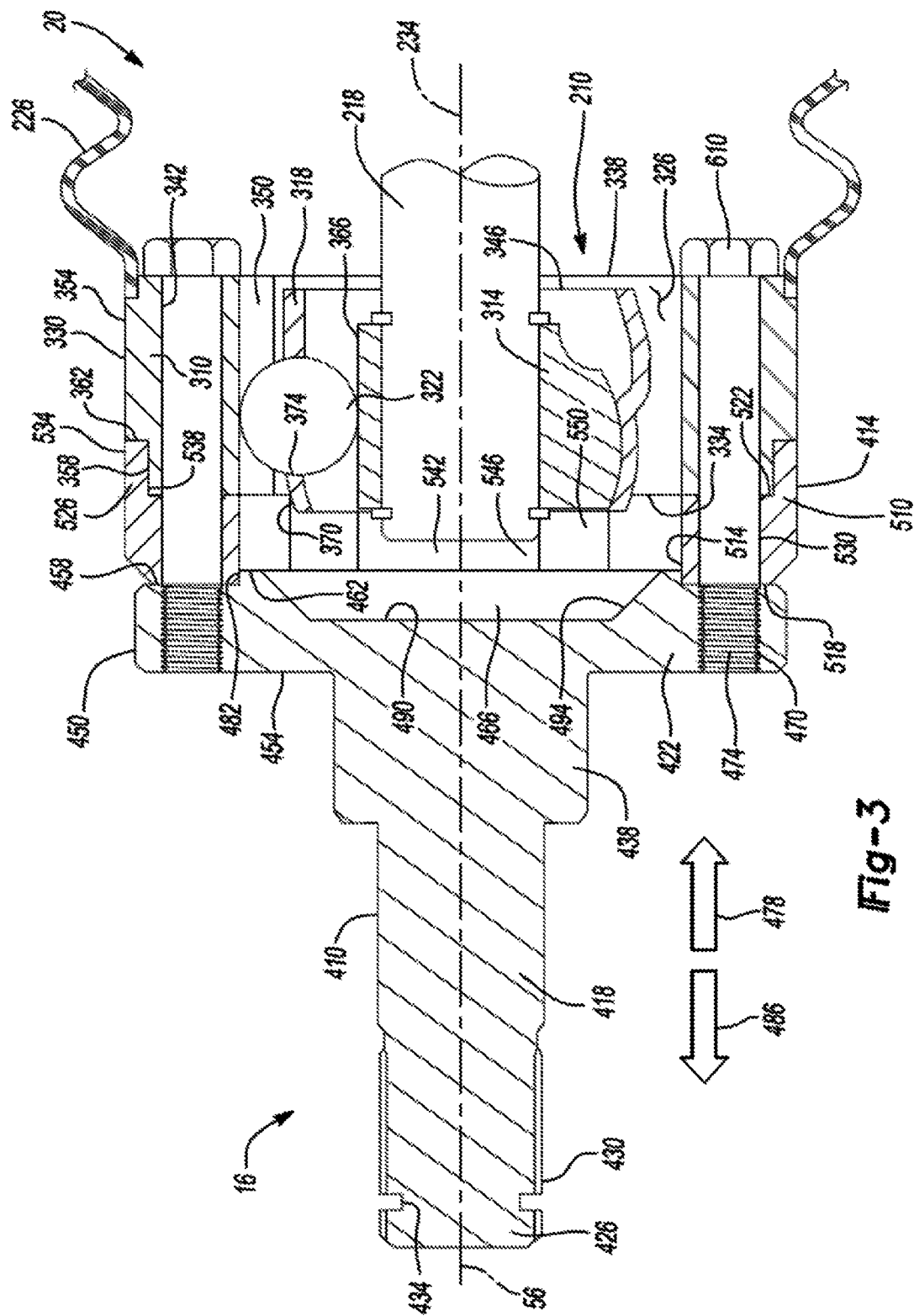
FIG. 3 is a sectional view of the output member of FIG. 2 illustrated with a corresponding one of the halfshafts of FIG. 1.
Figure 4:
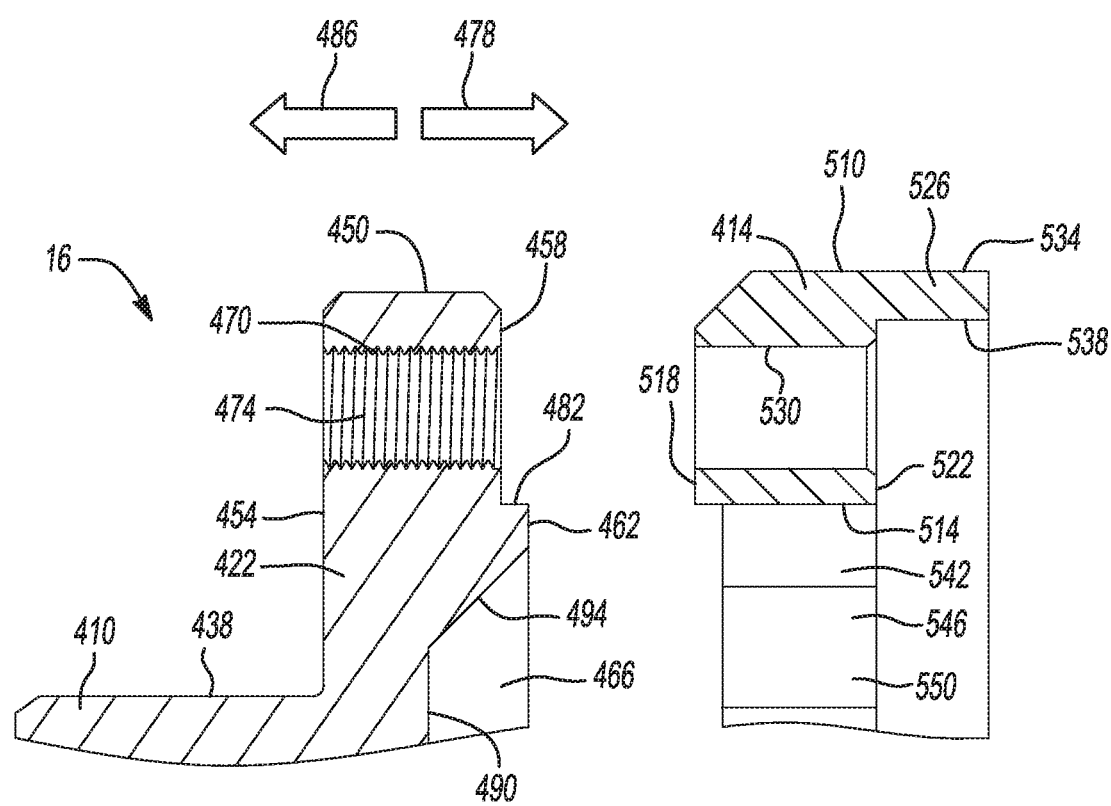
FIG. 4 is a sectional view of a portion of the output member of FIG. 2 showing an inner flange and an outer flange of the output member spaced apart from one another.

With additional reference to FIGS. 2-4, the first output member 16, and the constant velocity joint 210 (FIG. 3), are illustrated in greater detail. With specific reference to FIG. 3, the constant velocity joint 210 can include an outer member 310, an inner member 314, a cage 318, and a plurality of spherical bearings 322. The constant velocity joints 210, 214 can be similar. Accordingly, only one of the constant velocity joints 210, 214 will be described in detail and the description of the constant velocity joint 210 is incorporated herein with reference to the constant velocity joint 214.

The outer member 310 can be a generally cylindrical body having a first inner surface 326, a first outer perimeter 330, a first inboard side 334, a first outboard side 338, and can define a plurality of first bores 342. The first inner surface 326 can be a generally cylindrical surface and can define a central first cavity 346 and a plurality of outer races 350 (only one shown). The outer races 350 can be equally spaced about the circumference of the first inner surface 326 and can extend axially along the first cavity 346. The first outer perimeter 330 can have a first portion 354 and a second portion 358. The first portion 354 can have a first diameter. The second portion 358 can be concentric with the first portion 354 and can have a second diameter that is less than the first diameter. The intersection of the first and second portions 354, 358 can form a first step 362, where the first outer perimeter 330 can step down in diameter from the first portion 354 to the second portion 358. The first step 362 can be generally perpendicular to the output axis 56. Each of the first bores 342 can penetrate through the outer member 310 from the first inboard side 334 to the first outboard side 338 of the outer member 310. The first bores 342 can be circumferentially spaced about the outer member 310. In the example provided, the outer member 310 includes six of the first bores 342 that are equally spaced apart. The boot 226 can be fixedly coupled to the outer member 310 and the axle shaft 218 for common rotation therewith, though other configurations can be used.

The inner member can be disposed within the first cavity 346. The inner member 314 can be coupled to the axle shaft 218 for common rotation about the halfshaft axis 234. The axle shaft 218 can be coupled to the inner member 314 in any suitable manner, such as mating splines (not shown) formed on the axle shaft 218 and inner member 314 for example. The inner member 314 can define a plurality of inner races 366 (only one shown). The inner races 366 can be equally spaced about the circumference of the inner member 314 and can extend axially along the inner member 314. Each inner race 366 can align with one of the outer races 350.

The cage 318 can have an outer spherical surface 370 and can define a plurality of apertures 374 (only one shown). The spherical surface 370 can be configured to slidably engage the first inner surface 326 between the outer races 350. The apertures 374 can be circumferentially spaced about the cage 318. Each aperture 374 can penetrate the spherical surface 370 and can be configured to retain one of the spherical bearings 322. The apertures 374 can be equally spaced about the cage 318 to position the spherical bearings 322 in rolling contact with the outer member 310 and the inner member 314, such that each spherical bearing 322 is received within one of the outer races 350 and one of the inner races 366.

Returning generally to FIGS. 2-4, the second output member 18 can be similar to the first output member 16. Accordingly, only the first output member 16 will be described in detail and the description of the first output member 16 is incorporated herein with reference to the second output member 18. The first output member 16 can be a two-piece structure including a driven body 410 and an outer flange 414 that is separable from the driven body 410.

The driven body 410 can have a shaft portion 418 and an inner flange 422. The shaft portion 418 can be received in the housing 32 (FIG. 1) of the eDM 10 and extend outward from the housing 32. A first end 426 of the shaft portion 418 can be coupled to the first side gear 158 for common rotation about the output axis 56. In the example provided, the first end 426 of the shaft portion 418 defines a set of exterior splines 430 that can meshingly engage with a mating set of splines (not shown) formed on the first side gear 158 to non-rotatably couple the first side gear 158 to the shaft portion 418, though other configurations can be used. In the example provided, the first end 426 of the shaft portion 418 defines a circumferential groove 434 that extends in a circumferential direction about the first end 426. A generally "C" shaped retaining plate (not shown), commonly known as a C-lock, can be partially received in the circumferential groove 434 to retain the first side gear 158 axially on the shaft portion 418. A second end 438 of the shaft portion 418, that is opposite the first end 426, can have a diameter that is greater than the diameter of the first end 426, such that the shaft portion 418 can step up in diameter at the second end 438.

The inner flange 422 can be fixedly coupled to the second end 438 of the shaft portion 418 for common rotation therewith. The inner flange 422 can be disposed exterior of the housing 32 (FIG. 1). The inner flange 422 can have a generally cylindrical disc or plate shape having a second outer perimeter 450, a second inboard side 454, a second outboard side 458, and a lip or pilot shoulder 462. The inner flange 422 can define a central second cavity 466 and a plurality of second bores 470. The second outer perimeter 450 can have a diameter that is greater than the diameter of the second end 438 of the shaft portion 418. The second inboard side 454 can be fixedly coupled to the second end 438 of the shaft portion 418 for common rotation therewith. The second bores 470 can penetrate through the inner flange 422 from the second outboard side 458 to the second inboard side 454. Each of the second bores 470 can include a plurality of internal threads 474. The second bores 470 can be circumferentially spaced about the inner flange 422. In the example provided, the inner flange 422 includes six of the second bores 470 that are equally spaced apart and configured to align with the first bores 342 of the constant velocity joint 210.

The pilot shoulder 462 can have a generally cylindrical shape that can extend circumferentially about the output axis 56 and can extend axially in an outboard direction 478 from the second outboard side 458 to define a first pilot surface 482. The first pilot surface 482 can be generally perpendicular to the second outboard side 458 and generally concentric with the output axis 56. In the example provided, the pilot shoulder 462 can extend outboard from the second outboard side 458 a distance of approximately 2.5 mm, though other configurations can be used.

The second cavity 466 can be radially inward of the pilot shoulder 462 and can extend axially inboard of the second outboard side 458, i.e., in an inboard direction 486. In the example provided, the second cavity 466 is defined by a cavity wall 490 and a second inner surface 494. The cavity wall 490 can be generally parallel to the second outboard side 458 and can be axially inboard of the second outboard side 458. The second inner surface 494 can extend between the cavity wall 490 and the pilot shoulder 462. The second inner surface 494 can radially narrow with increasing axial distance from the pilot shoulder 462 in the inboard direction 486, until the second inner surface 494 terminates at the cavity wall 490.

The outer flange 414 can be a generally cylindrical body having a third outer perimeter 510, a third inner surface 514, a third inboard side 518, a third outboard side 522, and a pilot ring 526. The outer flange 414 can define a plurality of third bores 530. Each of the third bores 530 can penetrate through the outer flange 414 from the third inboard side 518 to the third outboard side 522 of the outer flange 414. The third bores 530 can be circumferentially spaced about the outer flange 414. In the example provided, the outer flange 414 includes six of the third bores 530 that are equally spaced apart and configured to align with the first and second bores 342, 470.

The third outer perimeter 510 can define the outer radial perimeter of the outer flange 414. The pilot ring 526 can extend axially in the outboard direction 478 from the third outboard side 522. The pilot ring 526 can be concentric with the third outer perimeter 510 and an outer perimeter 534 of the pilot ring 526 can be the same diameter as the third outer perimeter 510. The pilot ring 526 can define a second pilot surface 538 that can be concentric with the output axis 56 and radially inward of the outer perimeter 534 of the pilot ring 526. The second pilot surface 538 can be disposed radially outward of the third bores 530.

The third inner surface 514 and the second pilot surface 538 can define a central third cavity 542 disposed radially inward of the third outer perimeter 510. The third inner surface 514 can have an innermost diameter that is slightly greater than the diameter of the first pilot shoulder 462. The second pilot surface 538 can have a fourth diameter that is greater than the innermost diameter of the third inner surface 514, such that the third cavity 542 can generally step up in diameter from the third inner surface 514 to the second pilot surface 538.

The third inner surface 514 can include a series of annular segments 546 joined by a series of protrusions 550. Each protrusion 550 can extend radially inward from the annular segments 546, such that the protrusions 550 define the innermost diameter and the annular segments 546 have a diameter greater than the innermost diameter of the third inner surface 514. Each protrusion 550 can coincide with one of the third bores 530, and be concentric with one of the third bores 530, such that the annular segments 546 can be radially outward of a portion of the third bores 530. In an alternative construction, not specifically shown, the third inner surface 514 can be a continuous annular surface that is radially inward of the third bores 530 and defines the innermost diameter to be slightly greater than the diameter of the first pilot shoulder 462.

When assembled, the driven body 410, outer flange 414, and outer member 310 of the constant velocity joint 210 are positioned coaxially about the output axis 56. With reference to the inner and outer flanges 422, 414, the third inboard side 518 can abut the second outboard side 458. The outer flange 414 can be disposed about the pilot shoulder 462 such that the first pilot surface 482 can contact the third inner surface 514 to position and radially retain the outer flange 414 to be coaxial with the inner flange 422. In the example provided, a portion of each of the protrusions 550, which forms part of the third inner surface 514, can contact the first pilot surface 482, e.g., the protrusions 550 can rest upon the pilot shoulder 462.

With reference to the outer flange 414 and the outer member 310 of the constant velocity joint 210, the first inboard side 334 can abut the third outboard side 522. The pilot ring 526 can be disposed about the second portion 358 of the first outer perimeter 330, such that the second pilot surface 538 can contact the second portion 358 of the first outer perimeter 330 to position and radially retain the outer member 310 to be coaxial with the outer flange 414.

The inner flange 422, outer flange 414, and outer member 310 are coupled together by a plurality of threaded fasteners 610 (FIG. 3) that can be received in the bores 342, 470, 530. In the example provided, the threaded fasteners can be inserted into the bores 342, 470, 530 from the first outboard side 338 of the outer member 310 and can threadably engage the internal threads 474 of the second bores 470 to retain the halfshaft 20 to the output member 16.

To remove the eDM 10 from a vehicle (not shown) a typical flange (not shown) coupling a typical output member (not shown) to a typical halfshaft (such as halfshaft 20) requires the halfshaft 20 to have a plunge greater than the axial width of the entire flange to clear the entire flange. Typical halfshafts 20 do not have maximum plunge distances great enough to clear the entire flange and, thus, various suspension components (not shown) must be removed in order to move the halfshaft 20 out of the way and remove the eDM 10. In contrast, the output member 16 of the present disclosure permits the halfshaft 20 to be removed from the eDM 10 with minimal plunge of the halfshaft 20 and without the need to remove and reinstall suspension components (not shown). Specifically, once the threaded fasteners 610 are removed, the outer member 310 and outer flange 414 can be moved together in the outboard direction 478 just enough for the outer flange 414 to clear the pilot shoulder 462. Then, the halfshaft 20 can be swung out of the way of the remainder of the output member 16 and the eDM 10 can be removed from the vehicle. In the example provided, the halfshaft 20 and outer flange 414 only need to move axially in the outboard direction 478 about 2.5 mm (i.e. a plunge of 2.5 mm) to clear the pilot shoulder 462, though other configurations can be used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle drive module comprising:
  a housing;
  an electric motor coupled to the housing and having a motor output shaft;
  a transmission gear set received in the housing and coupled to the motor output shaft for transmission of rotary power between the motor output shaft and an output of the transmission gear set;
  a differential assembly including:
    a case supported within the housing for rotation about a first axis and drivingly coupled to the output of the transmission gear set;
    a pair of pinion gears received in the case and rotatable relative to the case about a second axis that is perpendicular to the first axis; and
    a pair of side gears received in the case and rotatable about the first axis, each of the side gears being meshingly engaged with the pair of pinion gears; and
  a pair of output members, each output member including:
    a driven body having a first end and a second end, the first end is drivingly coupled to a respective one of the side gears to receive rotary power therefrom, and the second end defines a circumferential lip; and
    an outer flange having an inner surface that defines a first inner cavity, the first inner cavity being adapted to receive a first portion of a constant velocity joint, and wherein the inner surface is releasably mounted about the circumferential lip;
  wherein the driven body has an outboard surface that is radially outward of the circumferential lip and configured to abut an inboard surface of the outer flange;
  wherein the driven body defines a plurality of first bores spaced circumferentially about the outboard surface of the driven body, and the outer flange defines a plurality of second bores, each of the second bores aligning with a respective one of the first bores; and
  wherein the first and second bores are adapted to receive a corresponding fastener therein to releasably couple the driven body and the outer flange for common rotation.

2. The vehicle drive module of claim 1, wherein the circumferential lip extends axially outboard from the outboard surface of the driven body by a distance that is less than 3 mm.

3. The vehicle drive module of claim 1, wherein the driven body defines a second inner cavity that is radially inward of the circumferential lip and extends axially inboard of the outboard surface of the driven body.

4. The vehicle drive module of claim 1, wherein the outer flange includes an outboard surface and a pilot ring, the outboard surface of the outer flange being opposite the inboard surface of the outer flange; and wherein the pilot ring is disposed radially outward of the outboard surface of the outer flange and extends axially outboard from the outboard surface of the outer flange a first distance to define a second inner cavity that is adapted to receive a second portion of the constant velocity joint.

5. The vehicle drive module of claim 4, wherein the circumferential lip extends axially outboard from the outboard surface of the driven body by a second distance that is less than the first distance.

6. The vehicle drive module of claim 1, wherein the first bores define a plurality of threads configured to mate with threads on the corresponding fasteners.

7. A vehicle drive module comprising:
a housing;
an electric motor coupled to the housing and having a motor output shaft;
a transmission gear set received in the housing and coupled to the motor output shaft for transmission of rotary power between the motor output shaft and an output of the transmission gear set;
a differential assembly including:
 a case supported within the housing for rotation about a first axis and drivingly coupled to the output of the transmission gear set;
 a pair of pinion gears received in the case and rotatable relative to the case about a second axis that is perpendicular to the first axis; and
 a pair of side gears received in the case and rotatable about the first axis, each of the side gears being meshingly engaged with the pair of pinion gears; and
a pair of output members, each output member including:
 a driven body having a first end and a second end, the first end of the driven body being drivingly coupled to a respective one of the side gears to receive rotary power therefrom, and the second end of the driven body including a first cylindrical portion and a second cylindrical portion, wherein the first and second cylindrical portions are coaxial with the first axis and the first cylindrical portion has a diameter greater than the second cylindrical portion, and wherein the second cylindrical portion extends axially in an outboard direction from the first cylindrical portion; and
 an outer flange that has an inner surface that defines a first inner cavity, the first inner cavity being adapted to receive a first portion of a constant velocity joint, and wherein the inner surface is releasably mounted about the second cylindrical portion;
wherein the outer flange includes an outboard surface and a pilot ring, the pilot ring being disposed radially outward of the outboard surface of the outer flange and extending axially outboard from the outboard surface of the outer flange a first distance to define a second inner cavity that is adapted to receive a second portion of the constant velocity joint.

8. The vehicle drive module of claim 6, wherein the first cylindrical portion has an outboard surface that is configured to abut an inboard surface of the outer flange.

9. The vehicle drive module of claim 8, wherein the driven body defines a second inner cavity that is radially inward of an outermost radial surface of the second cylindrical portion and that extends axially inboard of the outboard surface of the first cylindrical portion.

10. The vehicle drive module of claim 6, wherein the second cylindrical portion extends axially outboard from the first cylindrical portion a distance that is less than 3 mm.

11. The vehicle drive module of claim 6, wherein the first cylindrical portion defines a plurality of first bores spaced circumferentially about the first cylindrical portion, and the outer flange defines a plurality of second bores, each of the second bores being aligned with a respective one of the first bores; and wherein the first and second bores are adapted to receive a plurality of threaded fasteners therein to releasably couple the driven body and the outer flange for common rotation.

12. The vehicle drive module of claim 11, wherein the first bores define a plurality of threads configured to mate with threads of the threaded fasteners.

13. A half-shaft assembly comprising:
a shaft having an inboard end and an outboard end, the inboard end including a plurality of splines configured to receive torque to rotate the shaft about an axis;
an inner flange fixedly coupled to the outboard end of the shaft for common rotation about the axis, the inner flange including a cylindrical first disc and a pilot shoulder, the first disc having an outboard surface that is perpendicular to the axis and defines a plurality of first bores that are spaced circumferentially about the axis, each first bore being adapted to receive a fastener therein, the pilot shoulder extending axially in an outboard direction from the outboard surface of the first disc, the pilot shoulder having an outermost cylindrical surface that is radially inward of the first bores and parallel to the axis;
an outer flange including an inboard surface, an outboard surface, an inner surface, and a plurality of second bores, the inboard surface of the outer flange abutting the outboard surface of the first disc, the outboard surface of the outer flange being opposite the inboard surface of the outer flange and adapted to contact an inboard surface of a constant velocity joint, the second bores extending through the inboard and outboard surfaces of the outer flange and aligning with the first bores, the inner surface being radially outward of the outermost cylindrical surface of the pilot shoulder and radially inward of the first and second bores.

14. The half-shaft assembly of claim 13, wherein the pilot shoulder extends axially in the outboard direction from the outboard surface of the first disc by a distance that is less than 3 mm.

15. The half-shaft assembly of claim 13, wherein the inner flange defines a cavity that is radially inward of the pilot shoulder and extends axially inboard of the outboard surface of the first disc.

16. The half-shaft assembly of claim 13, wherein the outer flange includes a pilot ring that is radially outward of the second bores and extends axially in the outboard direction from the outboard surface of the outer flange such that a portion of the constant velocity joint that abuts the outboard surface of the outer flange is radially inward of the pilot ring.

17. The half-shaft assembly of claim 16, wherein the pilot shoulder extends axially in the outboard direction from the outboard surface of the first disc by a first distance, and the pilot ring extends axially in the outboard direction by a second distance that is greater than the first distance.

18. The half-shaft assembly of claim 16, further comprising the constant velocity joint, the constant velocity joint including an outer cylindrical body that has an inboard surface, an outboard surface, an outer cylindrical surface, and a plurality of third bores, the third bores extending through the inboard and outboard surfaces and aligning with the first and second bores, the inboard surface of the constant velocity joint abutting the outboard surface of the outer flange, and the outer cylindrical surface of the constant velocity joint is radially inward of the pilot ring.

19. The half-shaft assembly of claim 13, wherein the first bores extend through an inboard surface of the first disc, the inboard surface of the first disc being opposite the outboard surface of the first disc.

\* \* \* \* \*

UNITED STATES PATENT AND TRADEMARK OFFICE
CERTIFICATE OF CORRECTION

| | | |
|---|---|---|
| PATENT NO. | : 9,593,721 B2 | Page 1 of 1 |
| APPLICATION NO. | : 14/547565 | |
| DATED | : March 14, 2017 | |
| INVENTOR(S) | : Mats Strandberg | |

It is certified that error appears in the above-identified patent and that said Letters Patent is hereby corrected as shown below:

In the Claims

Column 12, Line 3, of Claim 8, delete "claim 6" and insert --claim 7--, therefor.

Column 12, Line 11, of Claim 10, delete "claim 6" and insert --claim 7--, therefor.

Column 12, Line 14, of Claim 11, delete "claim 6" and insert --claim 7--, therefor.

Signed and Sealed this
Twenty-third Day of May, 2017

Michelle K. Lee
*Director of the United States Patent and Trademark Office*